United States Patent Office

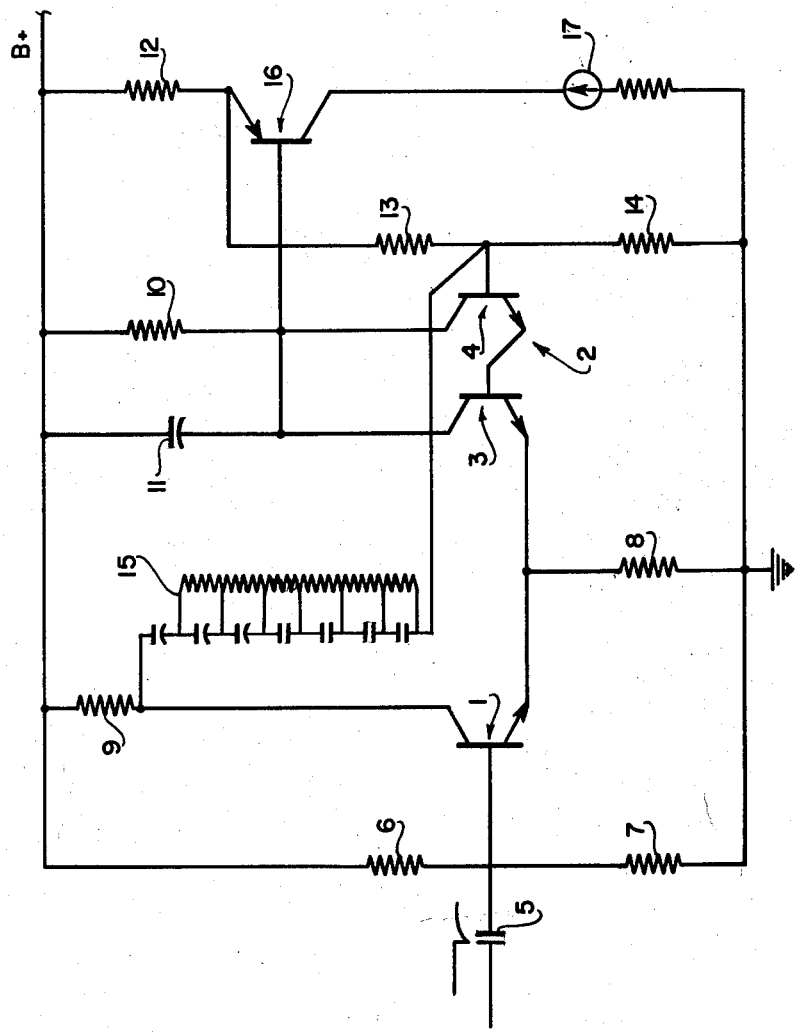

3,164,770
Patented Jan. 5, 1965

3,164,770
FREQUENCY METER COMPRISING A LOGARITHMIC MULTIVIBRATOR, INTEGRATOR AND METER
Loyce A. Turner, Smyrna, Ga., assignor to Lockheed Aircraft Corporation, Burbank, Calif.
Filed Oct. 3, 1960, Ser. No. 60,139
5 Claims. (Cl. 324—78)

This invention relates to multivibrators and more particularly to a logarithmic multivibrator for use in pulse counting circuitry.

Logarithmic circuits are generally utilized in the measurement of input signals wherein the signal frequency variation is large and it is desired to maintain a uniform percentage error throughout the signal range. Such circuits provide an output voltage characteristic whose amplitude varies as a function of the logarithm of the input signal.

Known devices having a logarithmic characteristic and utilized as frequency meters, random pulse counters, etc., are usually quite complicated and expensive, particularly where a number of decades are required. It is common practice to utilize parallel arrangements of logarithmic circuits each providing a response for a segment of the total signal range and then use a summation circuit for combining the separate outputs.

Furthermore, in those known counter circuits utilizing variations of the conventional multivibrator as the converter certain limitations are met with which introduce undesirable errors in the measurement. Multivibrators of this type are conventionally known as one-shot or monostable multivibrators, that is, an input signal is required to trigger the circuit to provide an output pulse. Inasmuch as the output pulse length is independent of the input frequency, such a circuit is suitable for measurement of non-random (i.e., evenly spaced pulses). In such a case, "dead time," or the percentage of the total time in which the circuit cannot accept an input signal, is unimportant.

However, where the input signal frequency varies over extremely wide limits, it is readily seen that "dead time" becomes quite important, since in such a case, the circuit will not respond to pulses applied to the input during the dead time. This results in a counting loss equal to the percent dead time. It is obvious that the dead time should be as nearly zero as possible in order that the instrument response not be a function of whether the signal is random or not. Unfortunately, the current carried by the normally off tube or transistor is its average current divided by the dead time expressed as a fraction. This means that for a one percent (1%) dead time, the ratio of the peak to average current in the normally off tube would be 100:1. Limits on allowable tube current normally make this ratio impractical and in a conventional count rate meter the dead time at full scale is of the order of 10 to 20%.

In a conventional one-shot multivibrator, the pulse length is independent of the frequency and, therefore, the percent dead time is proportional to percent of full scale reading. This means that although the meter may have a linear scale, the meter reading is not directly proportional to the count rate. For example, let us assume a full scale dead time of ten percent (10%). For a true random count rate corresponding to full scale, the meter will read ninety percent (90%) of full scale or a ten percent (10%) loss, whereas for a true random count rate corresponding to ten percent (10%) of full scale, the meter will read 9.9% of full scale or a one percent (1%) loss.

Accordingly it is an object of the present invention to provide a logarithmic multivibrator for counting random pulses.

Another object of the invention is to provide a logarithmic multivibrator to be used in a pulse counter and having a substantially constant error.

A further object of the invention is to simplify known counting techniques without sacrifice of desired accuracy.

A further object of the invention is to provide a logarithmic multivibrator in which the output current varies as the logarithm of the frequency.

A further object of the invention is to provide a logarithmic multivibrator which eliminates one or more of the known disadvantages of prior counting systems.

The above and other related objects will become more apparent from the following detail description and the single figure of the drawing which shows a preferred embodiment of the invention.

Briefly the invention accomplishes the above objects in the use of an RC network known to approach a logarithmic amplitude vs. frequency response as the coupling capacitor of a one-shot multivibrator and using a D.C. feedback loop to cause this network to vary the pulse length of the multivibrator in such a manner that the output current varies as the logarithm of the frequency.

With reference to the single figure of the drawing, a one-shot multivibrator is comprised of a first normally conducting transistor 1 and a second normally nonconducting transistor generally designated at 2, and shown as compound connected transistors 3 and 4.

The base of transistor 1 is connected to the input through a condenser 5 and bias is provided by the divider which is formed by resistances 6 and 7. The emitter of transistor 1 is connected through resistance 8 to ground potential and the collector is through resistance 9 to B+. Transistor 3 has its emitter connected to the ungrounded side of resistance 8 and its collector connected through the resistance 10—capacitance 11 to B+. Transistor 4 has its emitter connected to the base of transistor 3, its collector connected to collector of transistor 3, and the base is connected to the lower side of resistance 13 shown as part of a voltage divider made up of series resistances 12, 13 and 14. It will be noted that transistors 1 and 3 form an emitter coupled circuit. To complete the multivibrator, a special RC circuit 15 having a logarithmic characteristic is connected between the collector of transistor 1 and the base of transistor 4. While the compound connected transistor combination 3–4 is desirable because of its high gain characteristic, it should be understood that a single transistor may be used.

A transistor 16, having its base electrode connected to the collectors of transistors 3 and 4, and its emitter connected to the junction between resistances 12 and 13 is employed as a D.C. amplifier. The collector of transistor 16 is coupled to a meter 17.

In operation, a short negative pulse is applied to the base electrode of the normally conducting NPN transistor 1, and appears on the collector electrode as an amplified positive pulse. This pulse is coupled through the logarithmic network which produces a pulse with a logarithmic decay at the base of transistor 4. The positive pulse forward biases transistor 4 to render it conductive and drive its emitter more positive. Since the emitter of transistor 4 is coupled through transistor 3 to the emitter of transistor 1, the transistor 1 is rapidly cut off and the compound connected transistor is fully conductive.

Current through the compound connected transistors charge the long time constant RC circuit 10—11, that controls the bias on the base of transistor 4 through the D.C. amplifier and the voltage divider 12, 13, 14.

The logarithmic circuit discharges to a point where transistor 1 begins to conduct and the circuit resets, and the above cycle repeats when a new negative input pulse is applied to the base electrode of transistor 1. The reset level is thus automatically adjusted by means of the D.C. feedback through resistance 13 to the necessary value which corresponds to the ten percent (10%) dead time.

It should be apparent that the principles of this invention are not limited to transistors, but are equally applicable to vacuum tube multivibrators.

While in the preferred embodiment as described, a dead time of ten percent (10%) from 0.1 c.p.s. to 100,000 c.p.s. was obtained, other dead times are readily obtained by changing component values; however, a value below one percent (1%) would unduly complicate the circuit because of the very low average current value allowed. The ten percent (10%) dead time of the described embodiment does cause an error in counting random pulses. However, it is always a constant with the random value of 0.9 times the non-random value, which is well within the accuracy obtained by more complicated and expensive random pulse counting circuits presently known.

While a specific embodiment of the invention has been shown and described, it should be understood that certain alterations, modifications and substitutions may be made to the instant disclosure without departing from the spirit and scope of the invention as defined by the appended claims.

What is claimed is:

1. A logarithmic multivibrator having one stable condition of operation comprising a normally conducting current generator, a normally nonconducting current generator, an input source of random signals applied to said normally conducting current generator to render said generator nonconducting, a logarithmic R-C network connected between the output of said normally conducting generator to the input of said nonconducting generator to initiate conduction in said nonconducting generator, and a negative feedback circuit in the output of said nonconducting generator for biasing the input thereof, whereby the output current of said multivibrator is directly proportional to the logarithm of frequency of the input source of signals.

2. A monostable multivibrator for use in a counter of random pulses comprising first and second emitter connected transistors, means applying random pulses to the base electrode of said first transistor which is normally conducting to thereby render said first transistor nonconducting and said second transistor conducting an R-C network having a logarithmic decay connected between the collector of said first transistor and the base of said second transistor, feedback means connected between the collector and base electrodes of said second transistor to thereby provide an output current proportional to the logarithm of the frequency of said input random pulses.

3. A multivibrator as defined by claim 2, wherein said feedback means further includes a D.C. amplifier and means associated with said amplifier for indicating the magnitude of said output current.

4. A multivibrator as defined by claim 3, wherein said feedback means consists of a voltage divider connected between the D.C. amplifier and the base electrode of said second transistor to thereby automatically bias said second transistor proportional to said output current.

5. A monostable multivibrator comprising a first and second transistors, said transistors being biased for conduction and nonconduction respectively, an R-C network having a logarithmic decay coupled between the output of said first transistor and the input of said second transistor, an output circuit including a D.C. amplifier and divider network coupled to said second transistor for feeding back a portion of the output to automatically bias said input of the second transistor, a random pulse signal source coupled to the input of said first transistor and having such polarity as to cause said first transistor to cease conduction and transfer conduction to said second transistor, whereby an output current proportional to the logarithm of the frequency of said random source is provided.

References Cited in the file of this patent
UNITED STATES PATENTS

| | | |
|---|---|---|
| 2,366,076 | Wilbur | Dec. 26, 1944 |
| 2,510,381 | Cushing | June 6, 1950 |
| 2,688,079 | Wachtell | Aug. 31, 1954 |
| 2,750,456 | Walhauer | June 12, 1956 |
| 2,788,449 | Bright | Apr. 9, 1957 |
| 2,796,733 | Morton | June 18, 1957 |
| 2,882,400 | Zeidler | Apr. 14, 1959 |
| 2,976,427 | Armanini | Mar. 21, 1961 |
| 2,995,706 | Clarridge | Aug. 8, 1961 |